Figure 2:
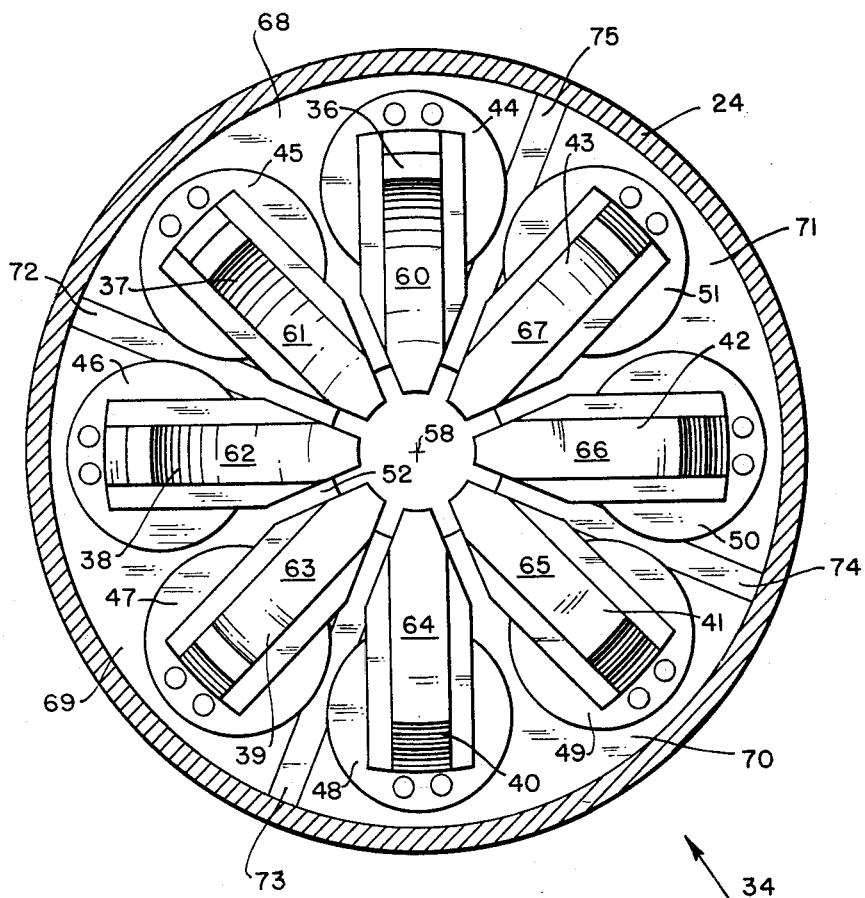

Oct. 13, 1959  L. M. BIBERMAN  2,908,171
MAGNETIC TORQUE MOTOR
Filed May 6, 1954  2 Sheets-Sheet 1
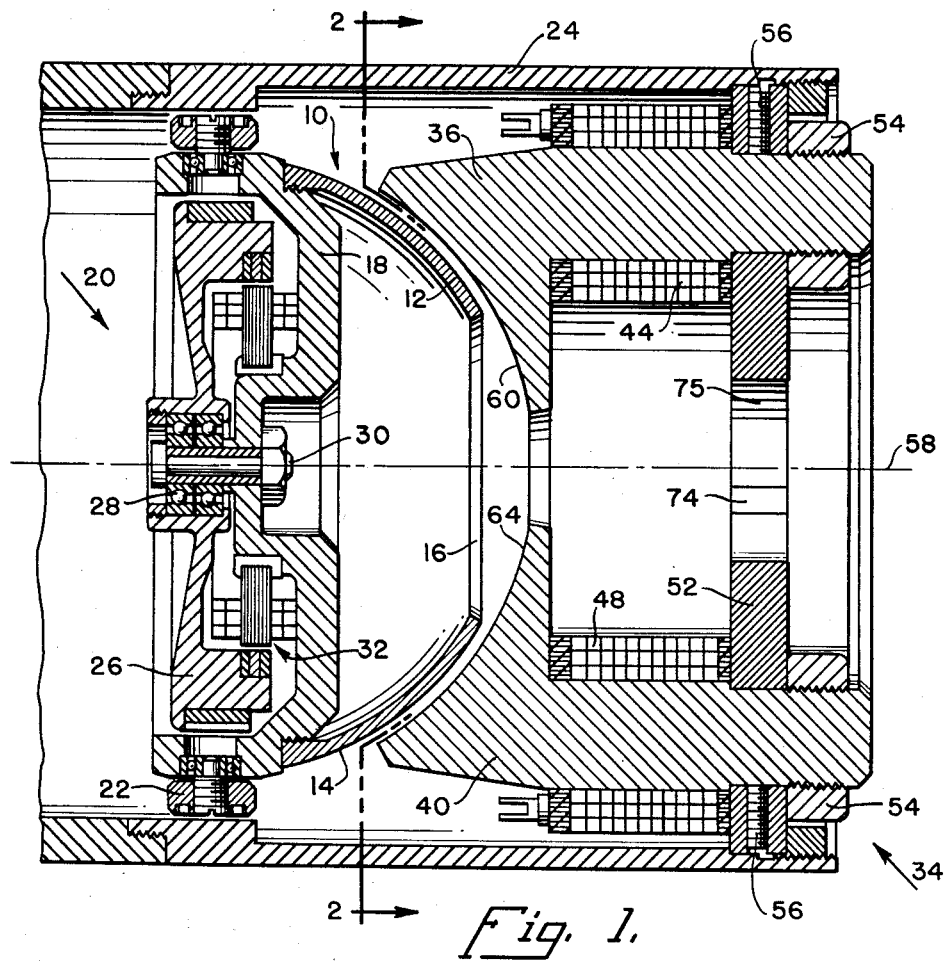
Fig. 1.
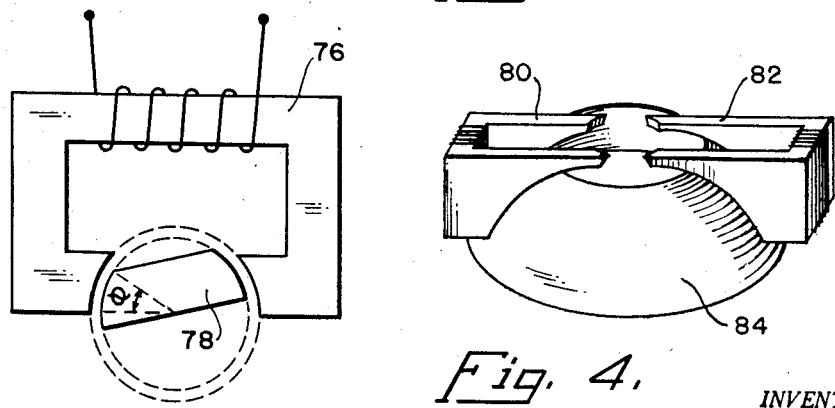
Fig. 3.
Fig. 4.
INVENTOR.
LUCIEN M. BIBERMAN
BY G. D. O'Brien
ATTORNEYS Oct. 13, 1959          L. M. BIBERMAN          2,908,171
                    MAGNETIC TORQUE MOTOR
Filed May 6, 1954                              2 Sheets-Sheet 2

INVENTOR.
LUCIEN M. BIBERMAN
BY
ATTORNEYS

United States Patent Office 2,908,171
Patented Oct. 13, 1959

2,908,171

MAGNETIC TORQUE MOTOR

Lucien M. Biberman, China Lake, Calif., assignor to the United States of America as represented by the Secretary of the Navy Application May 6, 1954, Serial No. 428,143

1 Claim. (Cl. 74—5.47)

(Granted under Title 35, U.S. Code (1952), sec. 266)

The invention described herein may be manufactured and used by or for the Government of the United States of America for governmental purposes without the payment of any royalties thereon or therefor.

This invention relates to a magnetic torque motor and in particular to an electromagnetic torque motor in which the torque produced is a linear function of the degree of energization.

The magnetic torque motor constituting this invention is particularly suitable for use in precessing a gyroscope. In many applications of gyroscopes it is desirable to precess the gyroscope in a given direction at a predetermined rate. Some examples where this is necessary is in gyro stabilized telescopes and in optical gun sights. In order to precess a two degree of freedom gyroscope in a predetermined manner, torques of the correct magnitude and direction must be applied to the gyroscope. It simplifies the construction of the servo loop of a gyro stabilized telescope, for example, if the torques produced are a linear function of the exciting signals applied to the torque motor.

In a torque motor for precessing a gyroscope it is also desirable that there be no residual torques developed in the absence of an exciting signal. There also should be a minimum of mechanical coupling between the gyroscope assembly and the torque motor so that the gyroscope may act as a free gyroscope, or as a uniformly precessed gyroscope, depending upon the absence or presence of exciting signals and regardless of the orientation of the gyroscope and motions of the device in which the gyroscope is mounted.

It is, therefore, an object of this invention to provide an improved magnetic torque motor for precessing a gyroscope.

It is a further object of this invention to provide an improved magnetic torque motor in which the torque produced is a linear function of the exciting currents applied to said motor.

It is a still further object of this invention to provide a magnetic torque motor in which the magnitude and direction of the torques produced are independent of the gyroscope orientation within predetermined limits.

It is another object of this invention to provide a magnetic torque motor which in the absence of exciting currents develops no torque.

Other objects and many of the attendant advantages of this invention will be readily appreciated as the same become better understood by reference to the following detailed description when considered in connection with the accompanying drawing wherein:

Fig. 1 is a sectional view of the torque motor and a two degree of freedom gyroscope, Fig. 2 is a section taken on line 2—2 of Fig. 1, and Figs. 3 and 4 are schematic views illustrating the principles of operation of the magnetic torque motor.

Referring now to Fig. 1 the rotor assembly, or armature, 10 of the magnetic torque motor consists of a hollow dome 12 of soft iron, the outer surface 14 of which is a spherical surface. A circular opening 16 is formed in dome 12, and in a preferred form subtends a half angle of 30 degrees about the center of the radius of curvature of spherical surface 14. Dome 12 is threadably secured to inner gimbal 18 of a conventional two degree of freedom gyroscope 20. Inner gimbal 18 is pivotally mounted within outer gimbal 22, and outer gimbal 22 is pivotally mounted by bearings which are not illustrated within housing 24. Rotor 26 of gyroscope 20 is mounted by means of ball bearing 28 for rotation on axle 30 which is mounted on inner gimbal 18. Rotor 26 is driven by a conventional hysteresis motor 32 which is schematically illustrated in Fig. 1.

The pole piece assembly, or stator assembly, 34, as seen in Figs. 1 and 2 consists of eight pole pieces 36, 37, 38, 39, 40, 41, 42, 43, and eight coils 44, 45, 46, 47, 48, 49, 50, 51, a coil being around each of the pole pieces, and the pole pieces being mounted on base plate 52. Base plate 52 completes the individual magnetic circuits and locates the pole pieces. Each of the pole pieces is secured to base plate 52 by a hexagonal nut 54. Set screws 56 lock each pole in the desired radial orientation. The pole pieces are equiangularly spaced with respect to axis 58 which is at right angles to the surface of base plate 52, and the pole pieces are oriented radially with respect to axis 58.

The torque motor is designed so that the center of curvature of surface 14 of dome 12 lies on axis 58 and coincides with the center of movement of dome 12 which is the point of intersection of the gimbal axes of gyroscope 20. Axis 58 is also perpendicular to the plane determined by the gimbal axes.

The pole faces 60, 61, 62, 63, 64, 65, 66, 67, of pole pieces 36, 37, 38, 39, 40, 41, 42, 43 are likewise spherical surfaces having the same center of curvature as surface 14 and are mounted so that the center of curvature of the pole faces lies on axis 58 at the intersection of the gimbal axes of gyroscope 20. As a result of this construction, the length of the airgaps between surface 14 of dome 12 and each of the pole faces 60, 61, 62, 63, 64, 65, 66, 67 of pole pieces 36, 37, 38, 39, 40, 41, 42, 43 are constant and do not change with the orientation of dome 12. In a preferred example, the lengths of each of the airgaps was chosen at 0.060 inch in order that machining inequalities in forming surface 14 and pole faces of the pole pieces will be so small, compared to airgap length, that the assumption that the length of each of the airgaps is constant and does not change with orientation of dome 12 is essentially correct. In a preferred example each pole piece extends from 10° to 60° from axis 58 measured from the center of curvature or an angular extent of 50°. Since the opening 16 in dome 12 subtends an angle of 60°, dome 12 may turn through 20° before the edge of openings 16 and the inner edges of the pole pieces line up.

Pole pieces 36, 37, and coils 44, 45 form an electromagnet, and pole pieces 40, 41 and coils 48, 49 form a second electromagnet. These two electromagnets form a pair of electromagnets, which when differentially energized, as will be explained later, exert a torque on dome 12 about an axis through the center of curvature of surface 14 of dome 12. Pole pieces 38, 39 and coils 46, 47 form a third electromagnet, and pole pieces 42, 43 and coils 50, 51 form a fourth electromagnet. The third and fourth electromagnets form a second pair of electromagnets which when differentially energized will exert a torque on the dome 12 about a second axis though the center of curvature of surface 14 of dome 12, which second axis is at right angles to the axis about which the first pair of electromagnets will exert a torque on dome 12.

To minimize magnetic interaction between adjacent pairs of pole pieces base plate 52 is divided into four pie shaped iron wedges 68, 69, 70, 71 which are isolated by strips of copper 72, 73, 74, 75, which are brazed to the adjacent iron wedges. In order to prevent gravity, or other accelerations to which the motor may be subjected from developing torques, it is necessary that all moving elements be statically and dynamically balanced.

Referring now to Fig. 3, it can be shown that the torque L exerted by the magnetomotive forces acting across an air gap between the coaxial cylindrical surfaces of the poles of electromagnet 76 and rotor 78, which is a section of a cylinder mounted for rotation about the longitudinal axis of the cylinder, is Eq. (1) $$L = \tfrac{1}{2}(NI)^2 \frac{dP}{d\theta}$$

where N is the number of turns, I is the current flowing and $$\frac{dP}{d\theta}$$

is the derivative of the permeance P of the air gap with respect to the angular position $\theta$ of rotor 78, or approximately at the rate at which the effective magnetic area of overlap increases with the angle of overlap. By the geometry of the design $$\frac{dP}{d\theta}$$

is a constant. The torque acts to cause the soft iron rotor 78 to rotate about its axis to increase the angular overlap at the pole faces. Equation 1 may also be written as follows:

Eq. (2) $$L = \tfrac{1}{2} N^2 (I_o + \Delta I)^2 \frac{dP}{d\theta}$$

where $I_o$ is the magnitude of the bias, or steady state, current flowing through the coil and $\Delta I$ is the differential current, or the exciting current.

If the circuit of Fig. 3 were folded so that the poles of the magnet are adjacent to and act upon the same cylindrical surface, and if the poles of a second magnet are placed adjacent to and act upon the opposing side of the cylindrical surface, a push-pull magnetic circuit would be obtained. A spherical equivalent of this is schematically illustrated in Fig. 4. It is to be noted in Fig. 4 that the surfaces of the pole faces of both magnets 80, 82 are concentric with the adjacent spherical exterior surface of dome 84, and that dome 84 is mounted so that it may pivot freely about two axes whose intersection lies at the center of curvature of both the dome and the pole faces of the magnets. When equal magnetomotive forces are applied to the opposing magnets 80, 82, the opposing torques are balanced and no torque is developed by dome 84. However, if the magnetomotive force is increased in one magnetic circuit and decreased in the opposing circuit, the magnetomotive force across the air gaps between the poles of one of the magnets increases while that in the other decreases. A resulting torque about one axis is generated that tends to increase the overlapping area of the dome and magnetic pole pieces in the circuit having the greater magnetomotive force. In a push-pull magnetic circuit of this type the differential torque, $\Delta L$, developed is a linear function of the differential exciting current $\Delta I$ applied to the electromagnets. The equation for a torque produced by one magnet is given by Equation 1 or Equation 2. The torque produced by two opposing magnets then becomes Eq. (3) $$L_{(right)} = \tfrac{1}{2} N^2 (I_o \pm \Delta I)^2 \frac{dP}{d\theta}$$

and

Eq. (4) $$L_{(left)} = \tfrac{1}{2} N^2 (I_o \mp \Delta I)^2 \frac{dP}{d\theta}$$

substracting 4 from 3 then gives

Eq. (5) $$\Delta L = \tfrac{1}{2} N^2 (4 I_o \Delta I) \frac{dP}{d\theta}$$

Eq. (6) $$\Delta L = 2 N^2 I_o \Delta I \frac{dP}{d\theta}$$

or

Eq. (7) $$\Delta L = K \Delta I$$

since $N$, $I_o$ and $\frac{dP}{d\theta}$ are constants

In the above equations the total current was broken into two components $I_o$ and $\Delta I$ where $I_o$ is equal to the value of the current flowing in each of the opposing electromagnets when no torque is developed. It will be seen from Equations 6 and 7 that the differential torque $\Delta L$ produced in a linear function of the differential current $\Delta I$. When the edge of opening 16 in dome 12 reaches the inner edge of the pole pieces, it no longer is true that $$\frac{dP}{d\theta}$$

is a constant since there is no longer a variation in overlapping area with increasing angle of overlap. In fact the derivative of permeance, P, with respect to the angle of overlap, $\theta$, is substantially zero and torques are no longer generated. The size of opening 16 is, therefore, one of the limiting design parameters of the torque motor.

The magnetic torque motor is designed to operate at relatively low flux levels. At relatively low levels of magnetomotive force the variation of the flux in the magneto circuit is a linear function of the magnetomotive force and there is very little difference between a theoretically perfect circuit, no saturation effect, and an actual circuit utilizing iron. As the magnetomotive force and the flux density increase this condition no longer is true. At reasonably high flux levels, an increase in magnetomotive force in one circuit and a corresponding decrease in magnetomotive force in an opposing circuit will result in the effective increase of the flux density in the first circuit of a relatively small value while the decrease of the flux density in the opposing circuit would be quite appreciable. This is due to the rapid increase in the iron losses with increase in the magnetomotive force in the one circuit and the rapid decrease in the iron losses with a decrease in magnetomotive forces in the opposing circuit.

The term $$\frac{dP}{d\theta}$$

is made constant within limits as stated above by the geometry of the design. The optimum operating range of the magnetomotive force is sufficiently low to diminish to insignificance non-linear variation in the iron losses in the electromagnets and in the dome caused by variations in permeance of the air gap as a function of angle of overlap.

The magnetic torque motor constituting this invention has been illustrated as being particularly suitable for exerting torque for precessing a gyroscope. Further, it has been illustrated as applying torque to a two degree of freedom gyroscope. It is obvious that the magnetic torque motor can be used to precess a single degree of freedom of gyroscope, and that it may be used where it is desirable to apply a torque which is a linear function of a differential current.

Obviously many modifications and variations of the present invention are possible in the light of the above teachings. It is therefore to be understood that within the scope of the appended claim the invention may be practiced otherwise than as specifically described.

What is claimed is:

Magnetic torque motor apparatus for precessing a gyroscope in a given direction at a predetermined rate comprising a gyroscope having a rotor and inner and outer gimbals, said rotor being mounted for rotation on said inner gimbal, said inner gimbal being mounted for rotation in said outer gimbal about an inner gimbal axis, and means for mounting said outer gimbal in a housing for said apparatus for rotation about an outer gimbal axis and having minimum mechanical coupling between the gyroscope and said housing, said gimbal axes intersecting orthogonally, said gyroscope in combination with a hollow dome mounted on the inner gimbal thereof, said dome being made of magnetic material, having an exterior spherical surface consisting of nearly a hemisphere and having a circular opening formed therein, said opening subtending a first half angle of 30 degrees with respect to the center of curvature of said spherical surface, the center of armature of said spherical surface coinciding with the intersection of said gimbal axes, and a stator having a base plate of magnetic material and eight pole pieces consisting of first, second, third and fourth pairs of electromagnets for producing a torque on said dome, said electromagnets having pole faces, said stator being mounted in said apparatus housing beneath said gyroscope in close relationship to said dome, the pole faces of said electromagnets being concentric with the exterior spherical surface of said dome and spaced therefrom to form air gaps of substantially uniform length between the pole faces and said dome, said pole faces being equiangularly spaced and mounted radially with respect to an axis at right angle to said base plate and intersecting said gimbal axes, each pole face extending over an arc of predetermined length, the predetermined length of said arc being substantially twice the precession arc from the axial position of the gyro, said base plate being divided equally into first, second, third and fourth sectors, said first, second, third and fourth pairs of electromagnets being mounted clockwise on the first, second, third and fourth sectors, respectively, of said base plate, said sectors completing the individual magnetic circuits of each pair of electromagnets, said sectors being isolated from each other by strips of non-magnetic material to minimize magnetic interaction between adjacent pairs of electromagnets, the inner edges of the pole faces lying on a circle which subtends a second half angle with respect to the intersection of the gimbal axes, said second half angle being smaller than said first half angle, the space between said pairs of electromagnets being occupied by only the atmosphere, the torque produced by said stator being a linear function of a differential exciting current applied thereto, and the magnitude and direction of the torques produced by said stator being independent of the gyroscope orientation throughout a cone of 20 degrees half angle.

References Cited in the file of this patent

UNITED STATES PATENTS

| | | |
|---|---|---|
| 1,390,471 | Sundhaussen | Sept. 13, 1921 |
| 2,418,032 | Jewell | Mar. 25, 1947 |
| 2,488,358 | Wendt | Nov. 15, 1949 |
| 2,600,476 | Bursack | June 17, 1952 |

FOREIGN PATENTS

| | | |
|---|---|---|
| 694,867 | Great Britain | July 29, 1953 |